United States Patent [19]

Takagi

[11] Patent Number: 4,510,853
[45] Date of Patent: Apr. 16, 1985

[54] COFFEE MAKING APPARATUS

[75] Inventor: Syoji Takagi, Toyoake, Japan

[73] Assignee: Tokyo Shibaura Denki Kabushiki Kaisha, Kawasaki, Japan

[21] Appl. No.: 577,815

[22] Filed: Feb. 7, 1984

[30] Foreign Application Priority Data

Apr. 20, 1983 [JP] Japan .............................. 58-58937[U]
Apr. 26, 1983 [JP] Japan .............................. 58-62814[U]
May 6, 1983 [JP] Japan .............................. 58-68288[U]

[51] Int. Cl.³ ............................................. A47J 31/42
[52] U.S. Cl. ....................................... 99/286; 241/38; 241/65; 241/277
[58] Field of Search ...................... 99/286, 287, 289 R, 99/289 D, 306, 289 P, 275, 279, 304, 305, 307; 241/277, 282.1, 38, 65

[56] References Cited

U.S. PATENT DOCUMENTS

| 2,868,109 | 1/1959 | Davis | 99/286 |
| 3,153,377 | 10/1964 | Bosak | 99/286 |
| 4,172,413 | 10/1979 | Roseberry | 99/286 |
| 4,196,658 | 4/1980 | Takagi | 99/286 |

FOREIGN PATENT DOCUMENTS 58-325 1/1983 Japan .

Primary Examiner—Robert W. Jenkins
Attorney, Agent, or Firm—Schwartz, Jeffery, Schwaab, Mack, Blumenthal & Koch

[57] ABSTRACT

A coffee making apparatus has a case, an electric motor, a grinder disposed on a driving shaft of the motor so as to rotate vertically along an interior surface of the case, means for providing hot water to the case, and means for extracting coffee. Coffee-beans are agitated and uniformly crushed by the grinder, so as to provide efficient coffee extraction.

9 Claims, 10 Drawing Figures

COFFEE MAKING APPARATUS

BACKGROUND OF THE INVENTION

The invention relates to a coffee making apparatus, more particularly to an improved grinder and an extractor system for coffee powder.

A conventional coffee mill has a grinder which is rotated horizontally in a case to crush coffee-beans. The grinder is positioned at the bottom of the case and rotated around a driving shaft by a motor, as shown in Japanese Pat No. Sho 58-325 published Jan. 6, 1983, and also in U.S. Pat. No. 4,196,658. The motor is mounted below the case. Therefore, coffee-beans are ground while being rotated horizontally together with the horizontally rotated grinder.

However, such an arrangement is disadvantageous in grinding a small amount of coffee-beans since the beans cannot be sufficiently ground with the grinder blade rotating only in a horizontal plane because an up and down stirring motion cannot be achieved.

In the conventional system, the coffee beans are only uniformly ground if there is exactly the correct amount of beans in the case. If there is more or less than the optimal amount of coffee-beans, all of coffee-beans are not stirred sufficiently, since the grinder only rotates horizontally. Accordingly, part of coffee-beans cannot be sufficiently ground, and the resultant mixture is not uniform in powder size. It is therefore difficult to extract coffee efficiently from the coffee powder.

Moreover, since coffee powder is left in the case after extracting coffee, an oil component of the coffee powder starts to dissolve in the case. If the oil component is left in the case for a long time, the case becomes nonsanitary and polluted because of decomposition of the oil component.

In a conventional apparatus, it is possible for hot water to leak from between the body of the motor and the driving shaft to the interior of the motor. In the conventional type apparatus in which the motor is disposed vertically at the top of the apparatus housing and in which the grinder is disposed on the driving shaft below the motor, it is also possible for steam to enter from between the housing of the motor and the driving shaft to the interior of the motor during coffee extraction. Therefore, it is necessary to completely seal the area between the housing and the driving shaft from hot water and/or steam, a procedure which is quite expensive

SUMMARY OF THE INVENTION

It is the primary object of this invention to provide a coffee making apparatus, in which homogeneous coffee powder is produced and in which coffee is extracted efficiently from homogeneous coffee powder.

It is another object of the invention to provide a coffee making apparatus, which may be inexpensively sealed between the motor housing and the motor drive shaft to prevent water from entering into the motor.

It is still another object of the invention to keep the case sanitary after use of the coffee making apparatus.

It is a further object of the invention to grind coffee-beans more efficiently.

Yet another object of the invention is to guard the coffee filter from damage by the coffee grinder.

To accomplish the foregoing and other objects in accordance with a preferred embodiment of the present invention, there is provided a case for receiving coffee-beans, an electric motor mounted to a housing having a drive shaft disposed thereon, a grinder disposed on the drive shaft, means for pouring hot water, and means for extracting coffee. The case has at least a cylindrical bottom. The grinder rotates vertically along the cylindrical bottom, and stirs coffee-beans up and down to make homogeneous coffee powder. Thus, coffee may be extracted efficiently from the coffee powder

BRIEF DESCRIPTION OF THE INVENTION

The invention may be understood in reference to the drawings, forming a part thereof, in which like reference characters denote like parts in the various views and embodiments, and like reference numbers with different letter suffixes denote corresponding parts of different embodiments wherein.

DESCRIPTION OF THE PREFERRED EMBODIMENTS

Figure 1:
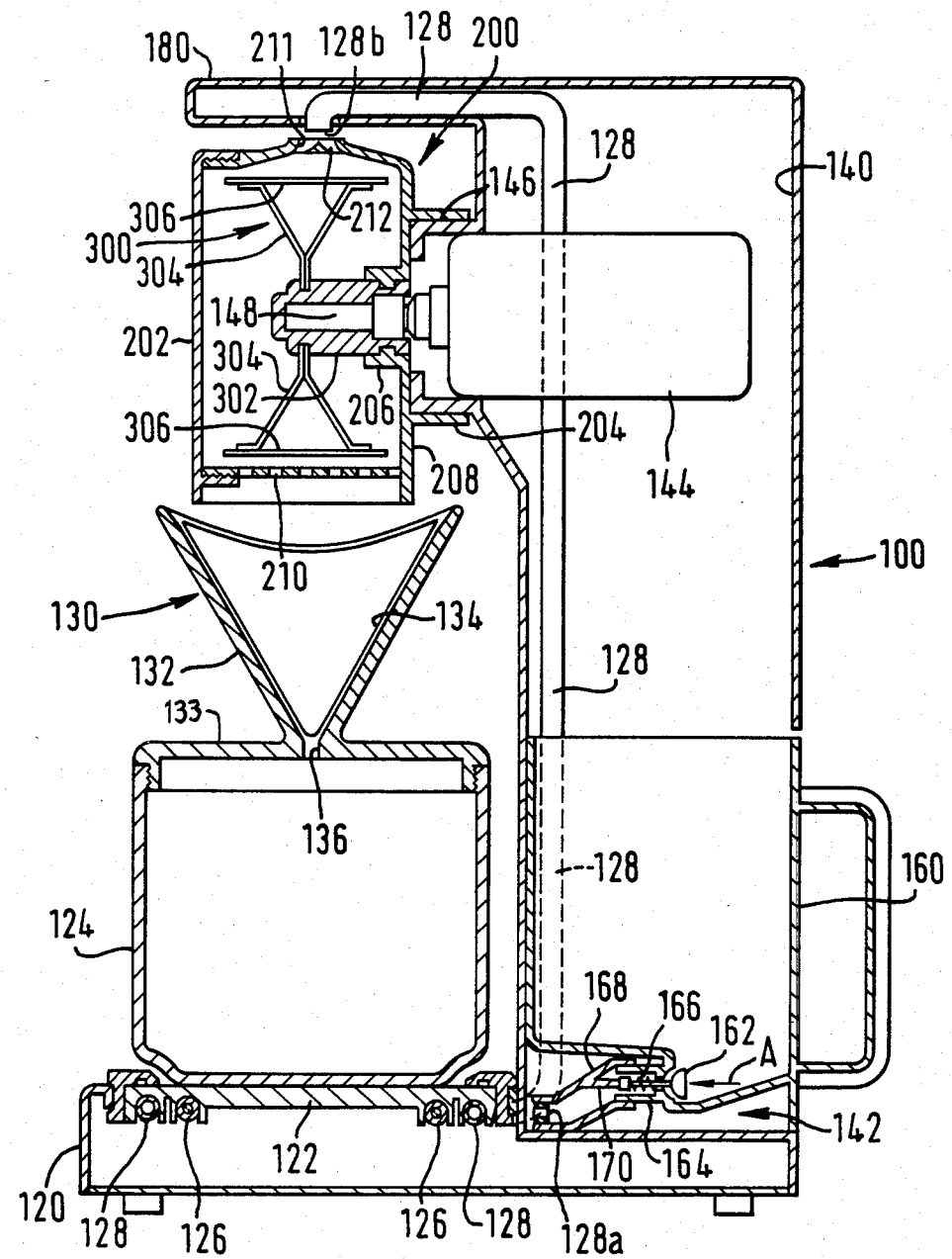
FIG. 1 is a vertical section view showing a first embodiment of the invention.

A first embodiment of a coffee making apparatus according to this invention is described with reference to FIGS. 1 and 2.

In these figures, reference numeral 100 designates a body or housing of the coffee making apparatus (hereinafter referred to merely as an "apparatus" when applicable). The body 100 of the apparatus comprises a base 120 in the form of a relatively flat rectangular container, and a frame 140 in the form of a rectangular box having a setting cavity 142 for accommodating a water storing tank 160. The frame 140 has a top plate 180 extended horizontally above the base 120. The water storing tank 160 is removably disposed on the setting cavity 142 between the frame 140 and the base 120. The base 120 has a supporting section 122 for supporting a coffee container such as a cup, bottle or pot 124. The pot supporting section 122 has a sheathed heater 126 and a water supplying pipe 128 which operate to make hot water.

The water storing tank 160 has a check valve 162 at a water supply outlet 164. The check valve 162 is biased by a coil spring 166 in the direction of arrow A to close the outlet 164. One end 128a of the pipe 128 is removably connected to the outlet 164 at a connecting portion 168. A projection 170 is made in the connecting portion 168 to depress the check valve 162 against the coil spring 166 when the water storing tank 160 is completely set to the setting cavity 142.

The frame 140 includes an electric motor 144 positioned above the water storing tank 160. The motor 144 is secured on a circular projected portion 146 of the frame, so that a drive shaft 148 of the motor is disposed horizontally. The drive shaft 148 is projecting from the circular projected portion 146 to the left as seen in FIG. 1.

Numeral 200 designates a case for coffee-beans, which has a horizontally cylindrical form. The case 200 has a cover 202, which is removably secured to the case by a peripheral screw, to enable coffee-beans to be placed therein. The case 200 also has a circular projection 204, which is constructed in the side of the case and fitted to the circular projected portion 146 to hold the case against the frame 140.

Numeral 206 is an axis supporting portion constructed in the form of a cylindrical inner projection at the center of a side wall 208 of the case 200. Numeral 300 shows a grinder to mill coffee-beans in the case 200. The grinder 300 is disposed on the drive shaft 148 by a cutter support 302. The cutter support 302 is movably connected between the drive shaft 148 and the axis supporting portion 206, and it is disposed rotatably with the shaft 148.

The grinder 300 consists of a pair of arm parts 304 and a pair of cutter parts 306. The arm parts 304 are fixed on the cutter support 302. The cutter parts 306 are connected with the arm parts 304 so as to be parallel with cylindrical face of the case 200 at a preferable distance from the inner surface thereof.

There are many apertures 210 at the bottom of the case. The size of the aperture 210 allows coffee powder to drop therethrough. A hot water receiving portion 211 is provided in the form of circular projection at the top of the case 200 to receive the hot water from the other end 128b of the water supplying pipe 128. The other end of the water supplying pipe 128 is provided above the portion 211. Numeral 130 designates an extractor to extract coffee from coffee powder using hot water. The extractor 130 consists of a funnel-shaped vessel 132 and a filter 134. The funnel-shaped vessel 132 is positioned on the pot 124 by a flat plate 133 below the apertures 210.

The vessel 132 has a slit 136 which permits coffee liquid to drop into the pot 124. The filter 134, which is made of paper or cloth, is made so that it may take on the same form as the vessel, i.e., concial.

The hot water receiving portion 211 includes holes 212 therein. The hot water is poured into the case 200 through the holes 212, and the holes 212 are formed so as to diffuse the hot water.

The operation of the first embodiment of the invention will now be described. Initially, case 200 is removed from the circular projected portion 146 of the frame 140. The grinder 300 remains attached to the cutter support 302 and is removed with the case 200. The cover 202 is removed from the case, and a predetermined amount of coffee-beans is placed inside. The cover 202 is then secured to the case again, and the case is installed on the frame projected portion 146 with the grinder positioned inside the case as clearly shown in FIGS. 1 and 2.

The water storing tank 160 is now removed from the setting cavity 142 of the frame 140. After pouring a predetermined amount of water (sufficient for serving for four persons, in general) into the water storing tank 160, the water storing tank 160 is once again placed on the setting cavity 142. When the tank 160 is removed from the frame, the check valve 162 closes the water supplying outlet 164 by the force of the coil spring 166 (indicated by arrow A in FIG. 1).

Figure 2:
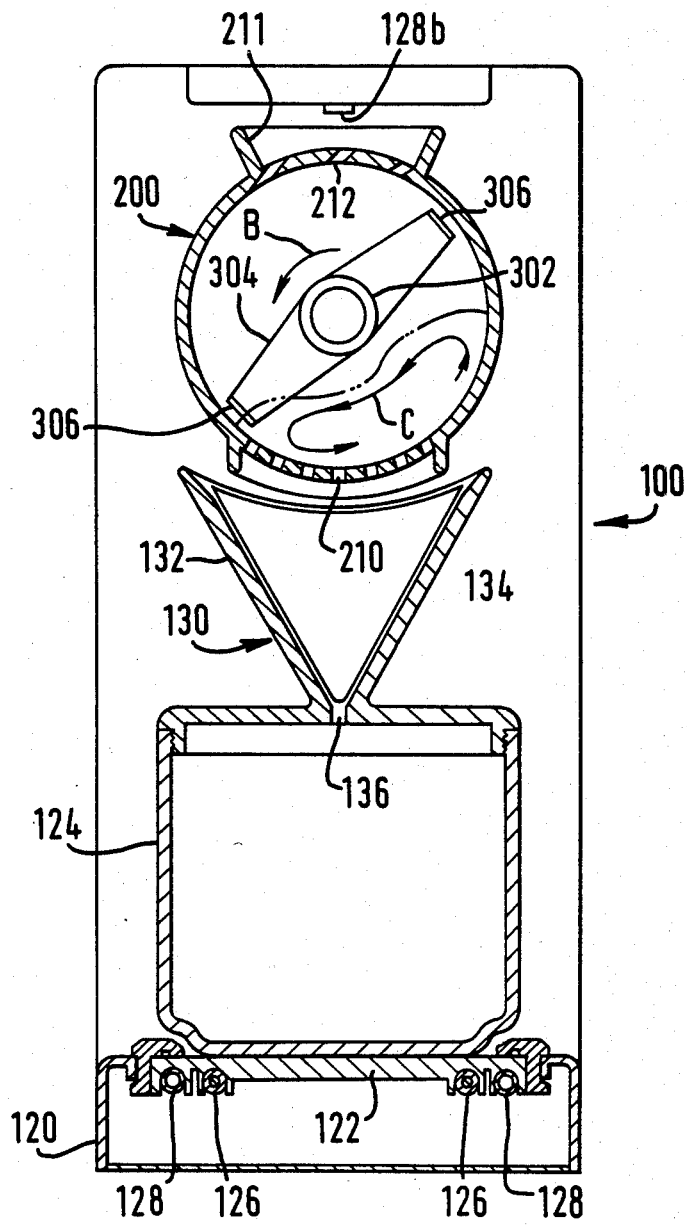
FIG. 2 is a sectional side view of the first embodiment illustrated in FIG. 1.

When the electric motor 144 is energized, the grinder 300 is rotated by the cutter support 302 around the drive shaft 148 (indicated by arrow B in FIG. 2). By rotating the cutter support 302, the cutter parts 306 of the grinder 300 rotate in the direction of arrow B along the inner arc-shaped surface of the case 200. This rotation occurs since the cutter support 302 extends horizontally from the motor 144 into the case 200. All coffee beans in the case are stirred up and down by the action of the grinder (indicated by arrow C in FIG. 2), and homogeneously ground. After the uniformly sized ground coffee is formed, the motor 144 is cut off.

Energization of the sheathed heater 126 heats pot 124. The heater 126 also makes hot water by heating water in the water supplying pipe 128 and the water storing tank 160. Boiling water pressure causes the hot water to flow from the tank 160 up through the pipe 128 to the pipe end 128b. The hot water drops from the end 128b of the pipe 128 to the hot water receiving portion 214 and accumulates therein. Thus, it drops into the case 200 through the holes 212.

Coffee powder in the case is washed down the extractor 130 by the hot water, and the case 200 is also washed thereby. Coffee powder which is stuck to the grinder 300 is also washed down by the hot water. The hot water and coffee powder pass through apertures 210 and are accumulated in the extractor 130. The hot water permeates the coffee powder in the extractor 130, and subsequently, coffee liquid is extracted through the filter 134 and accumulated in the pot 124 after passing through slit 136.

In the manner as described above, the water in the water storing tank 160 is continuously supplied as hot water into the case 200 through the pipe 128, and is extracted as liquid coffee from the case 200 for storage in the pot 124. The coffee in the pot 124 will remain hot while resting on the pot supporting section 122 by means of the heater 126 and a thermostat (not shown).

As is apparent from the above description, in the first embodiment of the coffee making apparatus according to the invention, the case 200 is provided in the form of a horizontal cylinder, and the grinder 300 is rotated vertically around the drive shaft 148 disposed horizontally along the inner arc-shaped surface of the case. The rotating field of the grinder extends over substantially all interior space of the case 200. Thus, even if an amount of coffee-beans in the case is less or more than the "correct" amount as described above in reference to conventional mill constructions, all of coffee-beans are ground equivalently by means of stirring of the coffee-beans by rotation of the grinder. The ground beans, i.e., coffee powder, are made of uniform size in spite of amount of coffee-beans used. Further, it is inexpensive to seal the region between the body of the motor and the drive shaft to prevent water from entering to the interior of the motor. Such sealing is simple to achieve since the driving shaft is disposed horizontally on the side of the case and is not in the direct path of dripping water or rising steam. Moreover, the case itself can be kept sanitary by the washing effect of the hot water during use.

The other embodiments of the invention will be described with reference to FIGS. 3 to 10.

Figure 3:
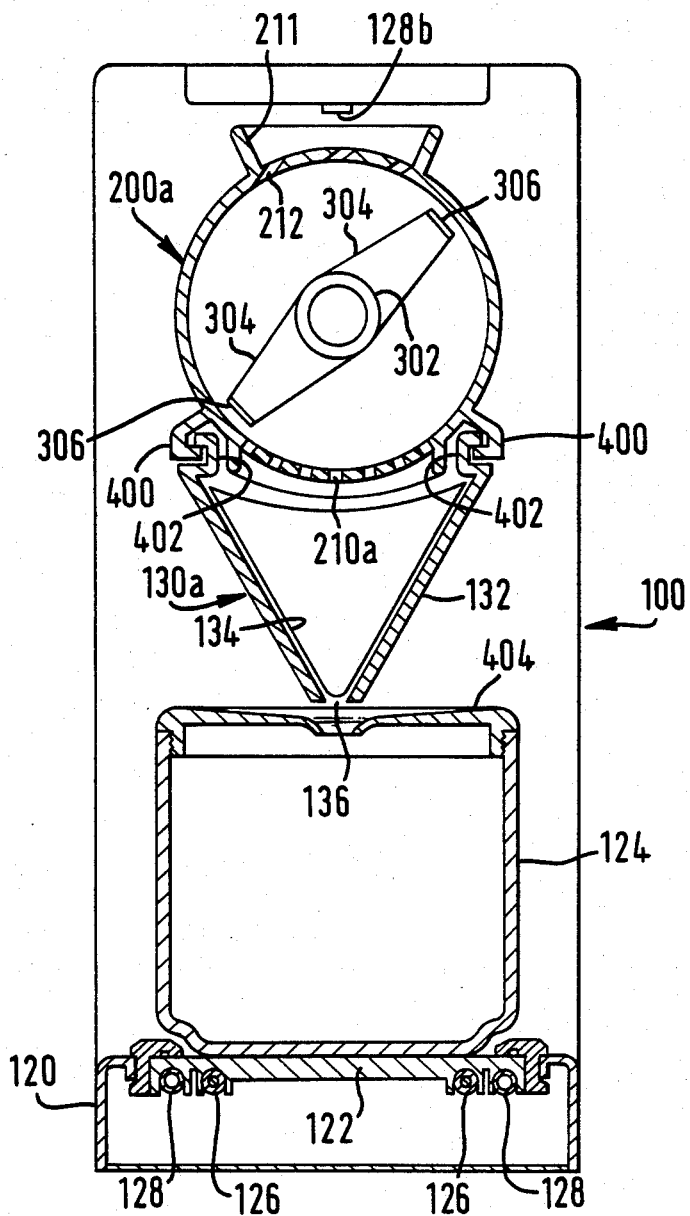
FIG. 3 is a sectional side view showing a second embodiment of the invention.
Figure 4:
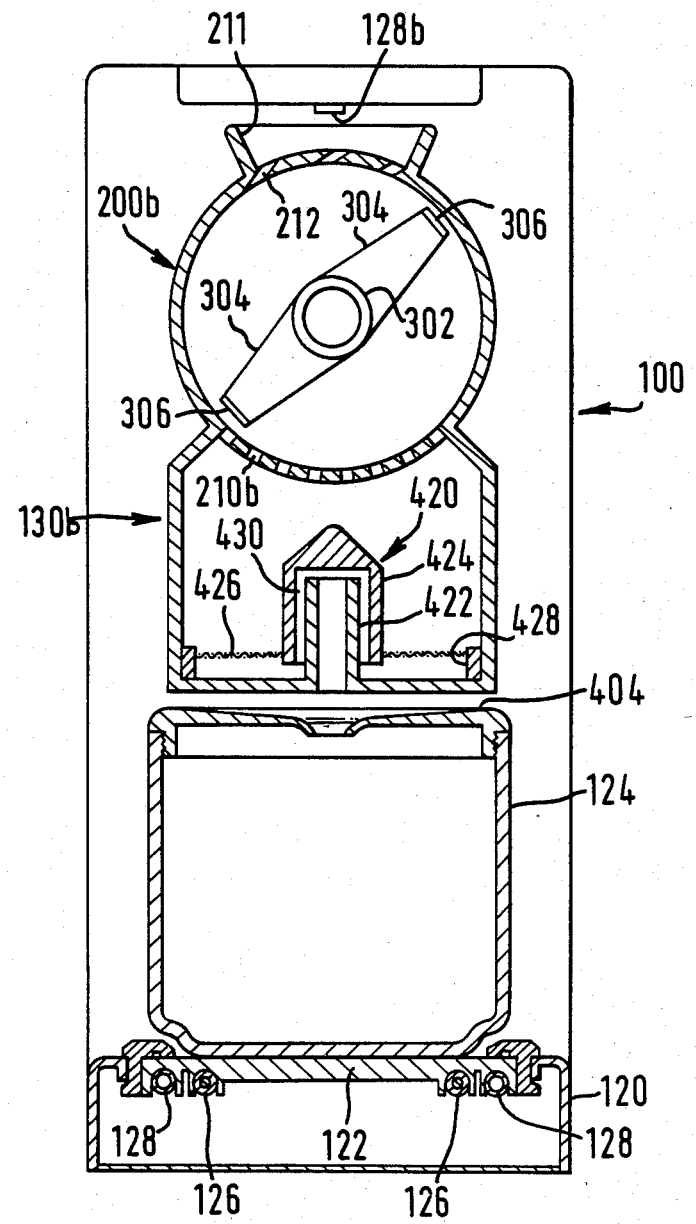
FIG. 4 is a sectional side view showing a third embodiment of the invention.

A second embodiment of the invention is shown in FIG. 3, wherein a different type of the extractor is designated.

Extractor 130a is removably disposed on case 200a instead of on the pot 124. The case 200a has a pair of holding members 400 around the apertures 210a. The extractor 130a includes a pair of flanges 402. The flange 402 is movably connected to the holding member 400 to maintain the extractor 130a as shown in FIG. 3. Numeral 404 designates a bottle cover which has a hole corresponding to a slit 136a in the extractor 130a to permit coffee to drop into the pot 124. The operation of the second embodiment is the same as that of the first embodiment of the invention.

A third embodiment of the invention is shown in FIGS. 4 to 7, wherein extractor 130b has a syphon mechanism 420. The extractor 130b is formed in the shape of a box to be removably connected to the case 200b. The pot cover 404 is the same as in the second embodiment of the invention.

Figure 5:
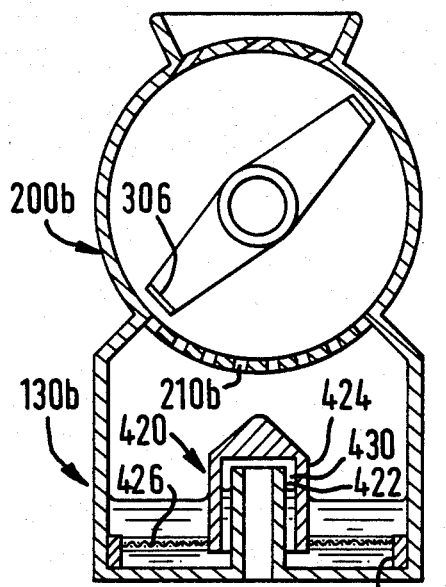
FIGS. 5 through 7 are enlarged sectional side views showing partial operation of the third embodiment illustrated in FIG. 4, namely: storing hot water in the extractor; the dripping process; and the condition of the apparatus after dripping.
Figure 6:
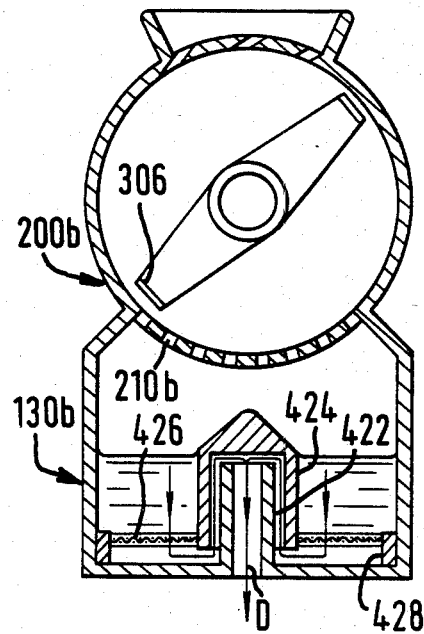

The syphon mechanism 420 includes a center pipe 422, a cylindrical cover 424 and a filter 426. The center pipe 422 is constructed at the bottom of the extractor 130b. The top of the center pipe 422 is covered with the cylindrical cover 424. The filter 426 is disposed horizontally around the cover 424, and is positioned at an optimum distance from the bottom of the extractor 130b by a rim 428. The cylindrical cover 424 is positioned to have a gap 430 between the interior thereof and pipe 422. When hot water drops into the extractor 130b through apertures 210b together with coffee powder, they are accumulated in the extractor 130b where they remain for a minute to extract coffee. Hot water increases in the extractor 130b and enters the gap 430, as shown in FIG. 5. If the surface of the hot water covers the top of pipe 422, hot water flows down by syphon action from the pipe as indicated by arrow D of FIG. 6. At this time, coffee is extracted from coffee powder by the filter 426.

Figure 7:
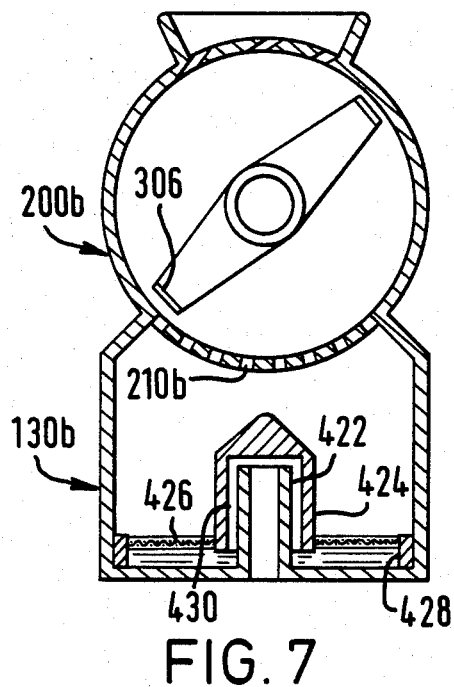

As described above, coffee-liquid is accumulated in the pot 124 through the pipe 422. When the syphon action occurs, hot water decreases in the extractor 130b. When there is a small amount of hot water in the extractor 130b, as shown in FIG. 7, coffee-liquid stops flowing. After that, the syphon action occurs again if hot water increases to cover the top of pipe 422.

Sufficient coffee is extracted during the time the hot water level is increasing.

The syphon action occurs repeatedly until that preferable amount of coffee liquid is stored in the pot. Thus, the coffee liquid has a sufficient extract of coffee by utilization of the syphon mechanism.

Figure 8:
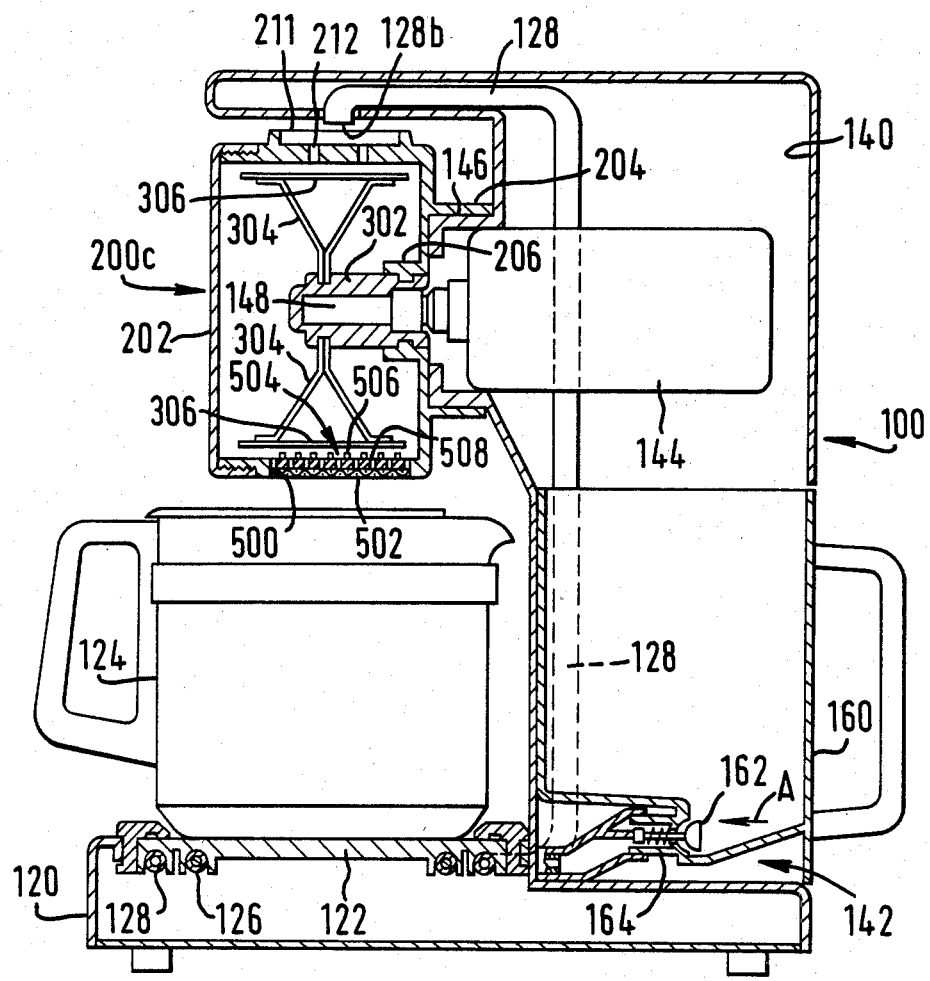
FIG. 8 is a vertical section view showing a fourth embodiment of the invention.
Figure 9:
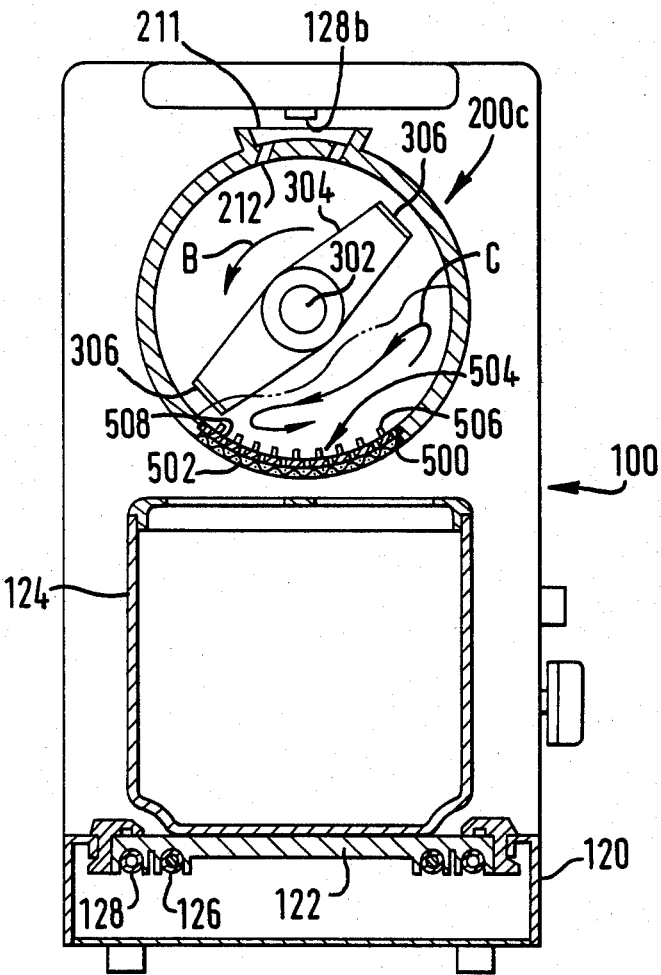
FIG. 9 is a sectional side view showing the fourth embodiment illustrated in FIG. 8.

A fourth embodiment of the invention is shown in FIGS. 8 and 9. The case 200c has an opening 500 at the bottom thereof and a filter 502 is disposed in the opening 500.

Numeral 504 denotes a metallic plate, which has many upward projections 506 and apertures 508. The metallic plate 504 is disposed on the filter 502 within the opening 500, and is fixed within the opening 500 at the bottom of the case 200c.

In operation, coffee-beans are crushed by the grinder and the combination of the grinder and projections 506 of the metallic plate 504. Therefore, coffee-beans are crushed sufficiently regardless of the amount used. As the metal plate 504 rests above the filter 502, it is possible to protect the filter from damage by the grinder. The coffee beans are stirred up and down as indicated by arrow C in FIG. 9.

Figure 10:
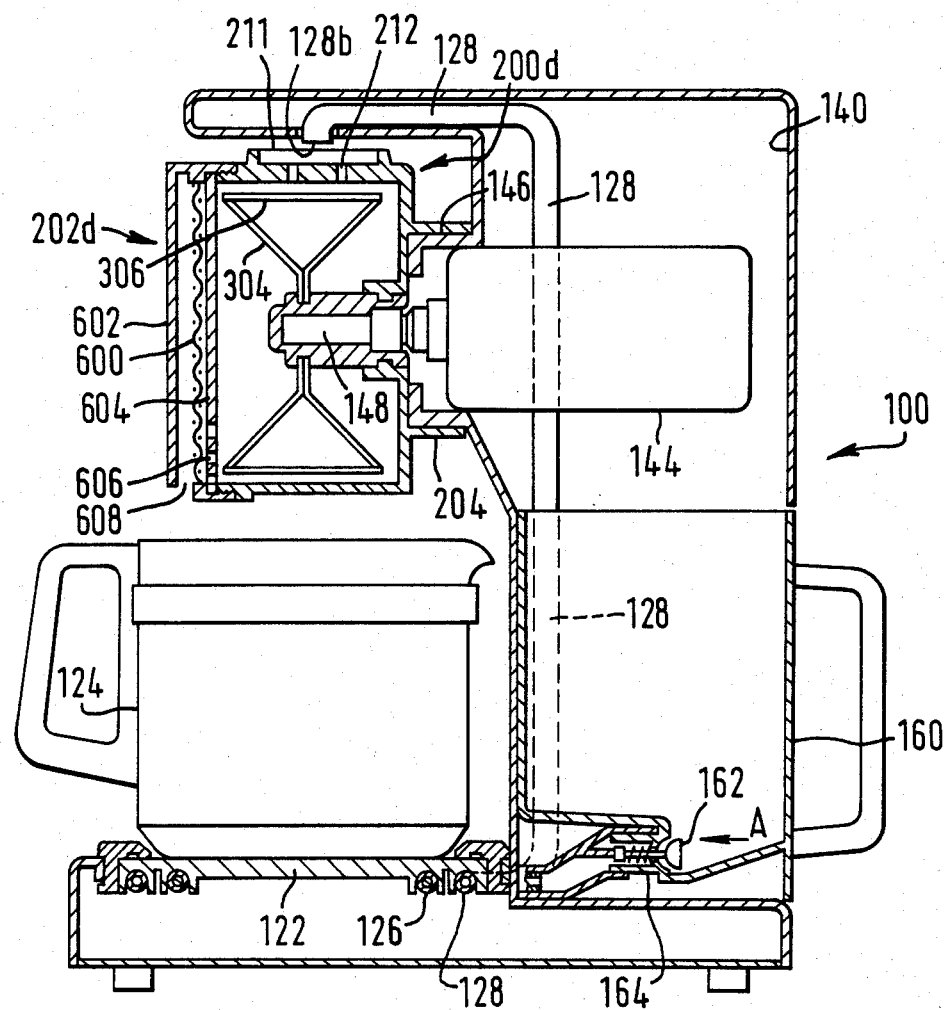
FIG. 10 is a vertical section view showing a fifth embodiment of the invention.

In FIG. 10, a fifth embodiment of the invention is shown. This embodiment has a filter 600 in the cover 202d instead of case 200d. The case 200d is cylindrical. The cover 202d includes filter 600, filter screen 602, and a shelter 604. The cover 202d is movably attached to the side of the case by a peripheral thread portion. The shelter 604 is provided to close the case, and has apertures 606 at the low side thereof. The filter 600 is movably disposed on the cover outside of the shelter 604 and is covered by the filter screen 602. The filter screen 602 is provided at a preferable distance from filter 600 and shelter 604, as shown in FIG. 10. The cover 202d has a gap 608 at the bottom thereof.

Hot water flows through the gap 608. Coffee is extracted from coffee powder by the hot water at the filter 600, and is stored in the pot 124.

When the grinder rotates vertically in the case, the bottom of the case is affected by the force of the rotating grinder and coffee-beans. If the filter is disposed on the bottom of the case as in FIG. 8, the filter is apt to be blocked and, may possibly break because of the rotation of the coffee powder and coffee-beans. In the fifth embodiment of the invention, however, there is no concern about the filter, since the filter is disposed on the cover instead of the bottom of the case.

As is clear from the above description in the coffee making apparatus according to the invention, the driving shaft of the motor is disposed horizontally in order to rotate the grinder vertically in the case. Accordingly, coffee-beans are crushed uniformly to extract coffee sufficiently regardless of the amount used, since they are stirred up and down by the grinder. Further, it is inexpensive to provide a seal between the body of the motor and the driving shaft.

While the invention has been described in reference to a preferred embodiment, it will be understood by those skilled in the art that various modifications may be made without departing from the spirit and scope of the invention as set forth in the appended claims.

What is claimed is:

1. A coffee making apparatus comprising:
   a housing;
   a case, installed on said housing, for receiving coffee-beans, said case having at least a cylindrical bottom and a plurality of apertures;
   an electric motor mounted on the housing, said motor having a drive shaft disposed horizontally and extending into the case;
   a grinder, disposed on said drive shaft and within the case, for rotating in a vertical plane and along said cylindrical bottom of the case, said grinder crushing coffee-beans to make coffee powder said grinder comprising cutter parts disposed parallel to said bottom of the case, and arm parts arranged between each of said cutter parts and said drive shaft for securing said cutter parts;
   means for providing hot water to the case, said means including a heater for heating water, said hot water and coffee powder passing through said apertures; and
   means, positioned adjacent said apertures, for extracting coffee from said coffee powder by said hot water.

2. A coffee making apparatus according to claim 1, wherein said means for extracting coffee is connected removably to the case.

3. A coffee making apparatus according to claim 2, wherein said means for extracting coffee further comprises:
- a vessel, having a funnel-shape to receive coffee powder and the hot water through said apertures; and
- a filter positioned on the surface of said vessel for extracting coffee by the hot water.

4. A coffee making apparatus according to claim 1, wherein said means for extracting coffee further comprises:
- an extractor container for receiving coffee powder and the hot water from said case;
- a syphon mechanism with said extractor container for diverting the flow of the hot water; and
- a filter, provided in said syphon mechanism, for extracting coffee by the hot water.

5. A coffee making apparatus according to claim 1, wherein said means for extracting coffee comprises a filter disposed on the bottom of the case.

6. A coffee making apparatus according to claim 5, wherein the case has an apertured metallic plate positioned on said filter.

7. A coffee making apparatus according to claim 6, wherein said metallic plate has a plurality of projections thereon.

8. A coffee making apparatus according to claim 1, wherein said means for extracting coffee is removably provided in a side wall of the case.

9. A coffee making apparatus according to claim 8, wherein said means for extracting coffee further comprises:
- a shelter, removably connected with the side wall of the case, for putting coffee-beans into the case, the shelter having a plurality of apertures therein;
- a filter, provided outside of said shelter, for filtering coffee grinds; and
- a filter screen disposed on the outside of and spaced from said filter.

* * * * *